Oct. 23, 1923.

I. DIAMOND

1,471,387

MOLD FOR POURED STRUCTURES

Filed March 31, 1920     7 Sheets-Sheet 1

Oct. 23, 1923.

I. DIAMOND

1,471,387

MOLD FOR POURED STRUCTURES

Filed March 31, 1920  7 Sheets-Sheet 4

Inventor
Israel Diamond
By E.M.Boud
Attorney

Oct. 23, 1923.

I. DIAMOND 1,471,387

MOLD FOR POURED STRUCTURES

Filed March 31, 1920     7 Sheets-Sheet 5

Inventor
Israel Diamond

Witness

Patented Oct. 23, 1923.

1,471,387

UNITED STATES PATENT OFFICE.

ISRAEL DIAMOND, OF WASHINGTON, DISTRICT OF COLUMBIA.

MOLD FOR POURED STRUCTURES.

Application filed March 31, 1920. Serial No. 370,162.

*To all whom it may concern:*

Be it known that I, ISRAEL DIAMOND, a citizen of the United States, residing at Washington, in the District of Columbia, have invented certain new and useful Improvements in Molds for Poured Structures, of which the following is a specification.

This invention relates to certain new and useful improvements in units for forming sectional and adjustable molds for concrete or other structures formed of poured plastic or semiplastic material.

The present invention pertains more particularly to structures of that class which are formed by pouring concrete, cement or any other required material in between, on or against forms or molds that have been set up, to the desired shape, said plastic material being allowed to harden in the form or mold, the hardened material forming the different parts of the permanent structure after the form or mold has been removed.

The present invention has for its objects among others to provide a sectional and adjustable form constructed of units that may be complete in themselves, readily set up to practically any desired shape, height and length, and after use easily taken down and reset, to either the same or any other desired shape with the least amount of labor and without liability of injury or damage to the forms or to the wall or structure thus formed, thus permitting the same sections or units to be used and re-used, to make up structures of different shapes, dimensions and designs.

The invention has for a further object to provide a sectional and adjustable form or unit which when properly assembled will hold itself to the desired shape and will support the weight and sustain the pressure of the plastic material placed on or against it, without the employment of supports, braces or stiffeners other than provided by the assembled sections or units of the form itself, and when one section is set up level and plumb to a desired line any other section set on or against it will automatically come to the desired position with little or no effort on the part of the operator.

The invention has for a further object to provide a sectional and adjustable form or unit that will dispense with, to a great extent, the usual practice of employing separators and ties that are generally run from the inner to the outer form to hold the several forms in the desired position until the plastic material hardens, such ties and separators ordinarily running through the plastic material, and, consequently, when the forms are removed, holes or openings are left in the wall where such separators and ties are removed. One form of the present invention makes it possible to build a wall without such separators so that there is attained the triple advantage of saving of the cost of filling in such holes, permitting the use of better and richer mixtures for the outer face of the wall by using temporary inserts or plates, and further permitting of the use of removable cores so as to form hollow walls, without interference with the spacing, and removal of temporary cores and plates.

The present invention further contemplates a unit with inclined sides as well as a collapsible unit, complete in itself.

Other objects and advantages of the invention will hereinafter appear and the novel features thereof will be particularly pointed out in the appended claims.

With the above, and other objects equally as important, that will become self-evident or apparent by the following description, the present invention consists of certain novel features which will be fully brought out in the following description of my invention, it being distinctly understood, however, that the various parts shown can be constructed in a variety of ways as to form and design other than those herein shown and I, therefore, do not intend to restrict myself to the exact construction, proportion of parts etc., as herein set forth, but reserve the right to make all structural and design changes without departing from the spirit of the invention or sacrificing any of its advantages.

Such embodiment of the invention, therefore, is clearly illustrated in the accompanying drawings, which, with the numerals of reference marked thereon, form a part of this specification, and in which—

Like numerals of reference indicate like parts throughout the several views.

Figure 2:
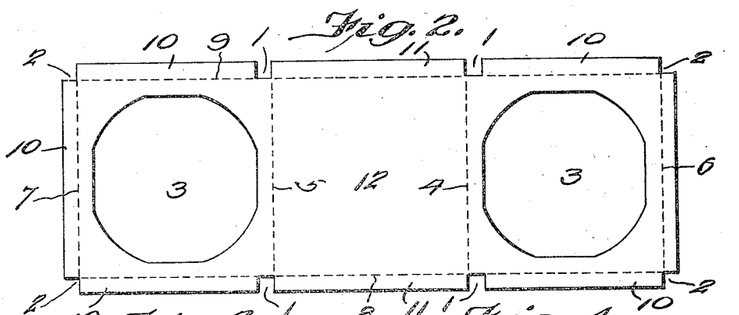
Figure 2 is a view of a member forming the major portion of a unit.

In carrying out my invention, I take for each unit a sheet of metal, as seen in Figure 2, of the desired size and thickness according to the required dimensions and strength of the unit and stamp or otherwise give such sheet the shape shown in Figure 2 by cutting out portions of the metal, as at 1, 1, and at the corners, as at 2, 2, and then stamp from such sheet near each end sufficient material to leave the open spaces 3, 3, which, by preference, are given the polygonal shape shown. This sheet is afterward to be bent along the dotted lines 4, 5, 6, 7, 8 and 9, as seen in Figure 2, to form flanges 10 along three sides of each end portion and flanges 11 upon the two outer sides of the central portion 12.

Figures 3, 4, 5, 6, 7:
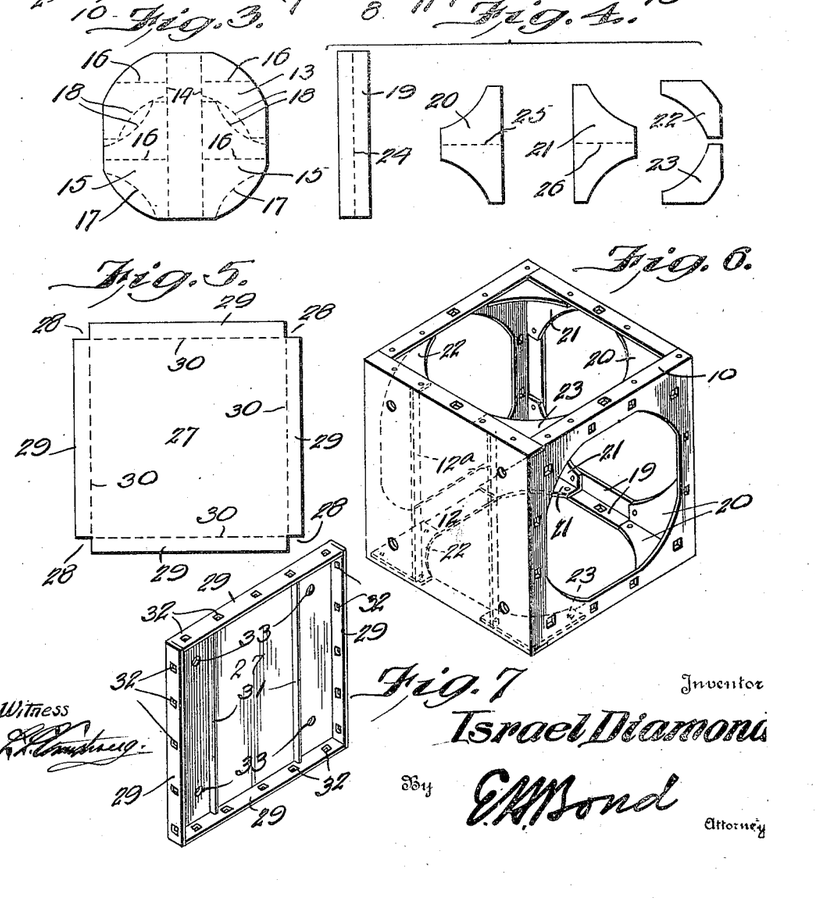
Figure 3 is a view of the portion cut out from one portion of the member shown in Figure 2, marked for cutting to form the parts shown in Figure 4.
Figure 4 is a view showing the parts formed by cutting the material shown in Figure 3 along the lines indicated in said Figure 3.
Figure 5 is a view of a blank from which is formed another part of the form.
Figure 6 is a perspective view of a complete unit or section.
Figure 7 is a view of the member formed from the blank shown in Figure 5, with ribs applied thereto.

It will be understood that I get two of such pieces 13, and the resultant pieces 19, 20, 21, 22 and 23 out of each blank shown in Figure 2, and all of these pieces are used in constructing the unit of Figure 6.

Referring to Figure 3, 13 is a piece of material cut from one of the end portions to form the open space or face 3 and I then mark this portion 13, as indicated by the dotted lines 14, 15, 16, 17 and 18, and then cut such portion 13 along these lines to form the members 19, 20, 21, 22 and 23, shown in Figure 4. The sections 19, 20 and 21 are designed to afterward be bent upon the dotted lines 24, 25 and 26, for a purpose hereinafter described.

Figure 6 shows a complete section or unit composed of the members seen in Figures 2, 3 and 4, the braces 20 and the members 22 and 23 and 19 being bolted or riveted to the adjacent parts, as will be readily understood upon reference to said Figure 6, to complete the unit having five open faces and one blank or closed face 12, it being understood that the flanges of the different members are all bent at right angles to the body portions of said members and that they constitute means for holding such members rigidly in the shape shown in Figure 6.

27 is a member having its corners cut out, as at 28, forming the flanges 29 which are designed to afterward be bent upon the dotted lines 30. Figure 7 shows the member 27 after the edge flanges have been bent at right angles to the body portion and this may be reinforced when desired by means of stiffeners 31 which may be secured in place by any suitable means. Similar stiffeners 12ª may be provided on the face plate 12, if required, as indicated by dotted lines in Figure 6, but are not necessary. The flanges may be provided with openings 32 to receive suitable means by which one section or member may be connected to another, and the member 27 is shown as provided with threaded openings 33 for the reception of combination separators and tie rods, when such are employed, to connect opposed sections together.

Figures 1, 19:
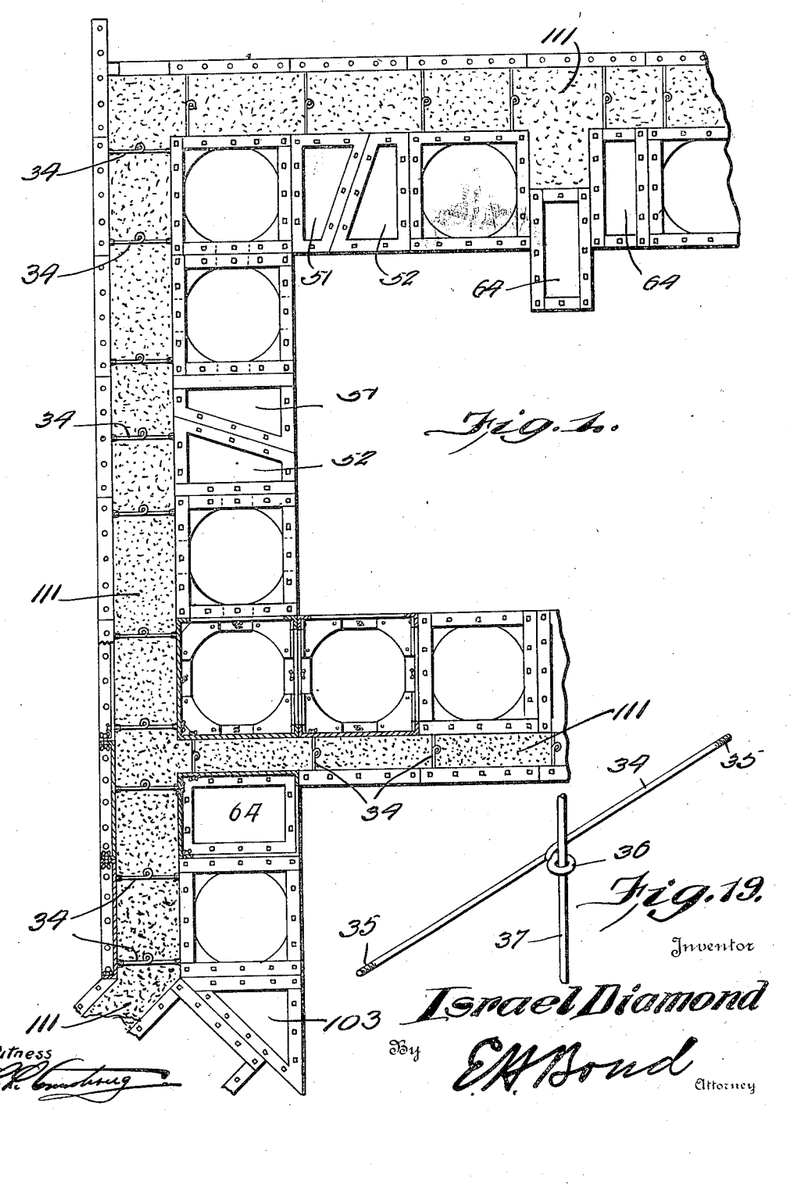
Figure 1 is a top view of part of a floor plan of a concrete structure formed by the employment of my improved sectional mold arranged to form the outer walls, partition, a projecting column on the inner face of a wall, and a portion of an octagonal-shaped bay-window projection.
Figure 19 is an enlarged perspective view of a combination tie rod and separator.

While in many instances separators or tie rods are not required, it may sometimes be desirable to employ such means, and when such is desirable under conditions where best results can be obtained by the use thereof, such a combined separator and tie rod as is shown in Figure 19 may be employed. This comprises a metal bar or rod 34 with its ends screw-threaded, as at 35, and intermediate its ends formed with a loop or eye 36, the said screw-threaded ends being adapted for threaded engagement with means engaged in the threaded openings 33 in adjacent faces of adjoining sections or units, as clearly seen in Figure 1, a vertical rod 37 being passed through the coincident eyes 36 of the aligning tie rods.

It being understood that a section or unit in its complete form is such as is represented in Figure 6, and with the understanding that a member 27, such as is shown in Figure 7, is employed to form the opposing member of the form and against which the face of the wall is molded, attention is called to Figure 1 which represents a part of a floor plan of a concrete structure in the course of construction with a number of the various units or sections of my improved sectional mold as above described arranged to form the outer walls, as well as a partition, a projecting column on the inner face of the wall and a part of an octagon-shaped bay-window projection employing other forms of units later to be described, I will now explain the method of setting up a form for a straight piece of wall. I first set up one or more of the units of the form shown in Figure 6, depending on the desired length of the wall, and the corresponding number of facing members such as shown in Figure 7, and then insert the required number of combined separators and tie rods, such as shown in Figure 19, as seen in Figure 1, the threaded ends thereof being engaged with threaded means in the threaded openings 33ª of the blank faces of the units of Figure 6, and threaded means in the corresponding threaded openings 33 of the member 27, shown in Figure 7 until I obtain the required space between such members, in accordance with the desired thickness of the wall.

Figures 8, 9, 10, 11, 12, 13:
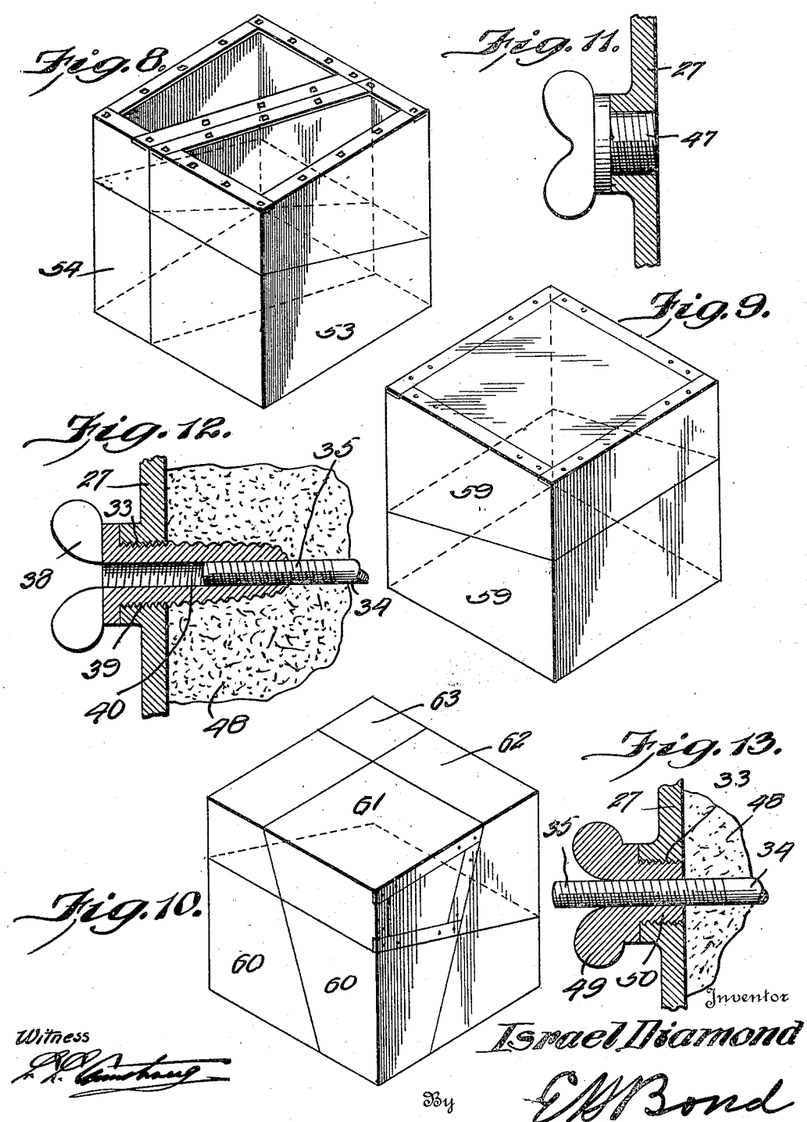
Figure 8 is a perspective view of a modified form of unit or section adapted for special use.
Figure 9 is a similar view of another form.
Figure 10 is a like view of still another form.
Figure 11 is a sectional detail showing one form of means for closing the hole in the form when tie-rods are not employed.
Figure 12 is a sectional detail showing another form of means for connection between different members.
Figure 13 is still another form for such purpose.

In Figure 12 I show a form of means for engaging the end of the member 34 consisting of the winged nut 38 having a threaded shank 39 engaging in the threaded hole 33 of the member 27 and having a threaded bore 40 to engage the threaded end 35 of the member 34. The sections of Figure 6 and the opposing members 27 of Figure 7 being set up a distance apart to form a wall of the required thickness, and the tie rods engaged as above described, by a turning movement the winged nut will hold the sections in the desired position opposite the facing members with the thickness of the wall desired, and by a similar turning movement engaging other winged nuts, tie rods and sections, it will be readily seen that by setting up the sections and the face members and connecting the same by means of the winged nuts to the tie rods one can quickly have ready for use a portion of a mold completely braced and held in place plumb and straight by its own weight and stability.

Figures 15, 16, 17, 18, 20:
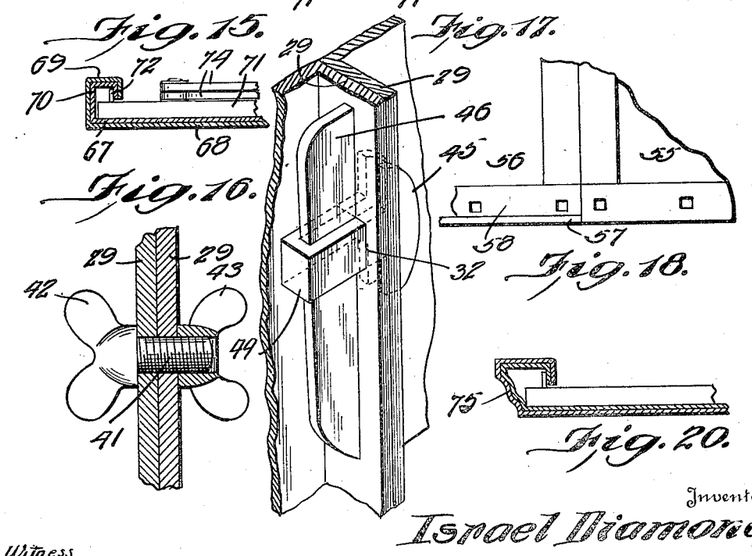
Figure 15 is an enlarged section through a portion of Figure 14.
Figure 16 is a sectional detail showing one form of means for connecting two sections together.
Figure 17 is a perspective view showing another form of means for connecting such sections.
Figure 18 is an elevation of part of two sections slightly enlarged and showing one section constructed in the regular way and the other section provided for the interchange of various plates for special uses.
Figure 20 is an enlarged sectional view of the telescoping section shown in Figure 14 with its outer edge molded or specially shaped to form panels or other special uses.

If it be desired to lengthen or raise the mold, the operation is repeated and section against section connected, or one section set on top of another and flanges of adjacent sections connected by means of a wing nut bolt, as 41, see Figure 16, and thumb nuts 42 and 43 upon opposite ends of the nut and upon opposite faces of the flanges 29, all as seen clearly in Figure 16. In lieu thereof, however, I may sometimes employ a socket member 44 having a head 45, and a wedge 46. As seen in said Figure 17, the socket member is passed through coincident openings 32 in the flanges 29 and the wedge 46 then driven through the socket so that the sections are tightly drawn together, as will be self-evident upon an inspection of Figure 17.

The number of tie rods may vary, less being required in setting up sections other than the first, and when the lesser number is employed the remaining holes in the faces of the sections may be plugged up by means of winged bolts 47, as seen in Figure 11, for an obvious purpose. When the form of connection of the ends of the tie rods shown in Figure 12 is employed, when the winged nuts are removed by an opposite turning movement after the concrete has hardened and the various sections are disconnected from their adjoining sections, the latter may be readily removed leaving in the wall the tie rods, the threaded ends thereof being a small distance back from the face of the wall, as will be readily understood upon reference to Figure 12 wherein 48 indicates the concrete, permitting the pointing up of the small holes caused by the removal of the winged nuts. The loops 36 in the tie rods help to keep the tie rods from pulling out from the wall and also serve as convenient means for tying the reinforcing members thereto where it is desired to have one or both ends 35 of the tie rod project beyond the completed face of the wall. In this latter case, I employ a winged nut 49 having its threaded shank 50 engaged in the threaded hole 33 of the blank face of the section member, as shown clearly in Figure 13.

Figure 27:
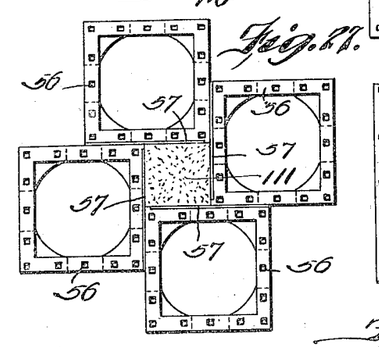
Figure 27 is a plan view of a column built by the use of four regular sections with a special plate attached to each.
Figure 29:
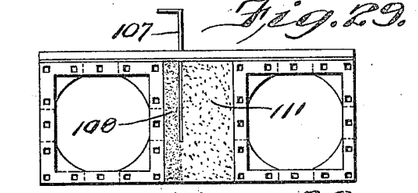
Figure 29 is a detail of a wall constructed by setting up two molds the proper distance apart and tying the same across the top to hold them so spaced, doing away with the use of separators through the wall.

In order to permit of forming walls of any given length and height, I may sometimes employ fractional parts of units of the general form above described and shown in Figure 6. For instance instead of making the unit square I can divide such square unit into a number of parts, two or more, forming smaller units, as seen in Figure 1 at 64, two different forms thereof being seen in such figure. For instance, in Figure 1 I have shown two of such units, one in the longitudinal wall and one in the transverse wall and I may employ one or more of such fractional units or parts as may be required to form the desired shape. Another shape of such fractional unit, for other uses, is seen in Figure 8, wherein will be seen a complete hollow unit or section of a size and shape the same as that of Figure 6, but made up of a number of smaller parts 51, 52, 53 and 54, any one or more of which fractional parts may be used, as may be required to form the shape and size of wall desired. For instance, in Figure 37 I show a number of the sections 51, and in Figure 38 I show two of such sections used to form the room, or an inclined wall or surface. By combining several of such fractional parts of a section or unit I can build up a form for a wall of the required character and shape.

Where it is desired to form a corner by building two walls at a right angle or any other angle to each other, I may use a section having special provision for the changing of plates, as shown in Figure 18 wherein one section 55 is of the character shown in Figure 6 and the other, 56, made smaller than the one shown in Figure 6 by the thickness of strips of metal 57, and which may be used as a regular section by having strips of metal 57 attached to flanges 58, and thus bring it to the regular size, or, by removing the strips 57 and fastening plates of any other desired shape to either return corners of wall, or for any other imaginable use, some suggestions of which are shown in Figures 27 and 29.

Figure 9 shows another form of fractional unit composed of wedge-shaped parts 59, 59, while in Figure 10 will be seen another form of wedge-shaped members 60 which are subdivided to form smaller sections 61, 62 and 63, thus adapting the sections for use in connection with the other forms described, in making forms of almost any conceivable shape and size..

Figure 28:
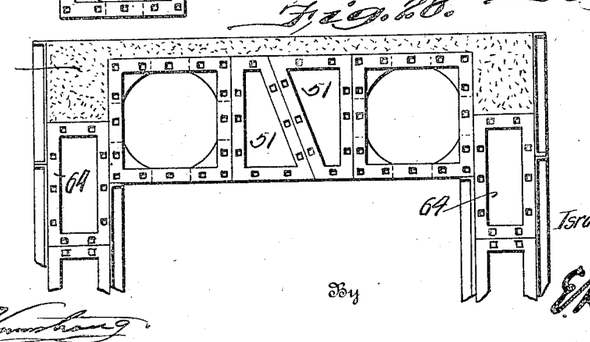
Figure 28 is a part section and part elevation of two columns, two beams and floor constructed by the use of my sectional mold.
Figures 33, 34, 35, 36, 37, 38, 39:
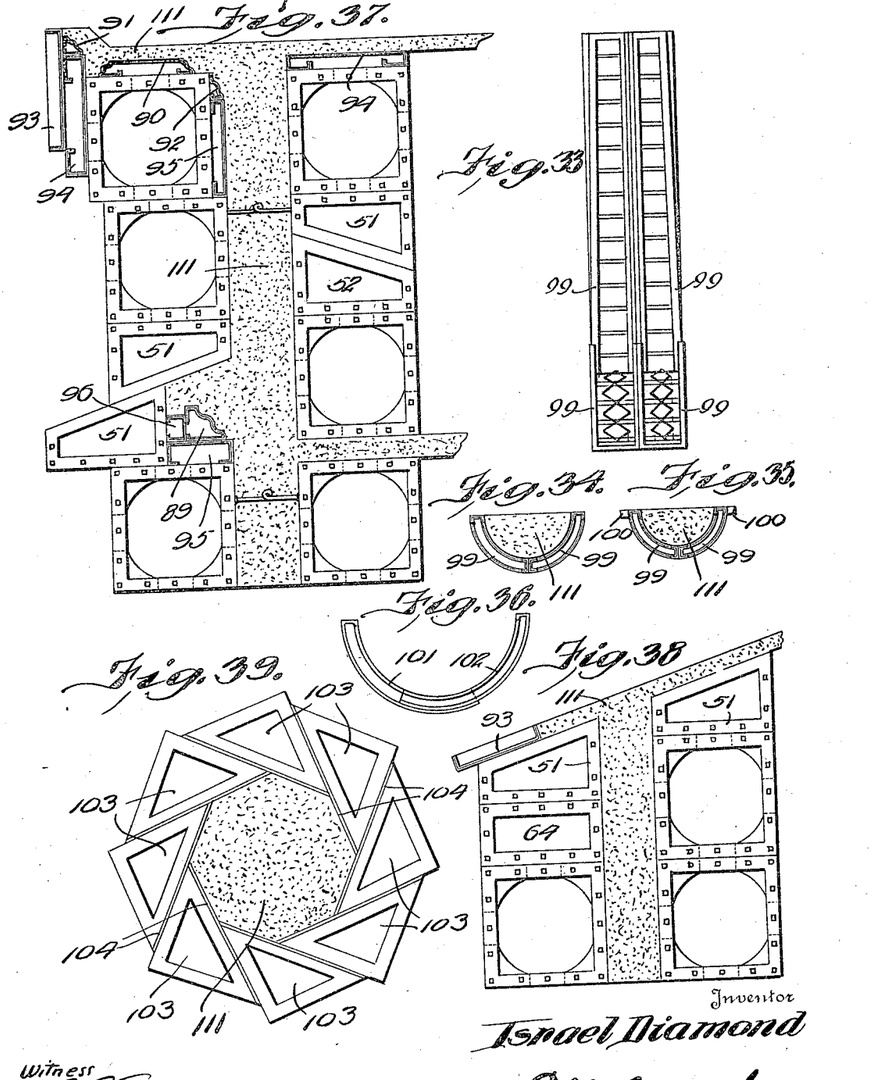
Figure 33 is a view in elevation of a column form built by the use of telescoping sections.
Figure 34 is a plan of the lower portion of a form and column of Figure 33 built by the use of curved telescoping sections.
Figure 35 is a similar view of the upper end of the form and column shown in Figure 33.
Figure 36 is a view of a telescoping section similar to that shown in Figure 24, but built on a circle so as to permit of the use of the same in forming the inside of a well or tunnel.
Figure 37 is a view showing some of the various shapes that can be formed by the use of my sections.
Figure 38 is a detail showing another shape capable of construction by means of my invention.
Figure 39 is a plan of a column built by using sections with special plates attached.

When it is desired to build a number of walls running in different directions, as seen in Figure 1, or a wall, floor and ceiling, as shown in Figure 37 or as in Figure 28, it is evident that the hardened walls, floor or ceilings will so enclose the units as to make it practically impossible to remove the forms unless one section is demolished. In order to overcome this the modified units or sections shown in Figures 8, 9 and 10, are employed, each unit consisting of two, four or eight specially made wedge-shaped fractional pieces and each fractional unit being preferably constructed as nearly as possible along the lines shown, said wedge-shaped fractional units being connected up so as to be of the same diamensions as the unit of Figure 6, as will be clearly understood upon reference to Figures 8, 9 and 10. The use of such wedge-shaped fractional units will be clearly understood upon reference to Figures 28, 37 and 38, as well as Figure 1 before mentioned, Figure 37 showing at the lower left hand portion one of the many ways in which such wedge-shaped units may be employed. This provides a means of release where the hardened material encloses the form on two sides. In other cases it will be found necessary to use units built up of four or eight wedge-shaped fractional units, such as shown in Figures 8 and 10. Other uses will suggest themselves in practice, such as making the wedge-like cut at various angles so as to form roofs of different pitch or walls at different angles, as will be readily understood upon reference to Figures 1, 28, 37 and 38, which show various forms and arrangements of units and fractional units and it will be evident that the use of the units of Figure 6, and the fractional units and wedge-shaped members of Figures 8, 9 and 10 can be combined to make almost any conceivable shape, form or size or character of wall.

Figure 14:
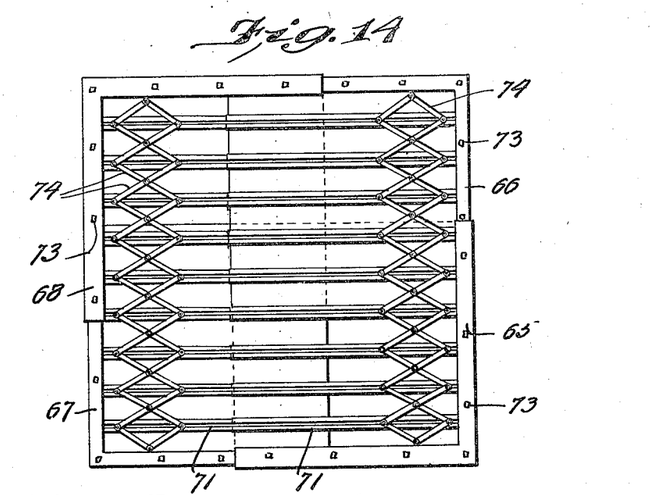
Figure 14 is a view of the back side of a telescoping section that can be expanded to several times its collapsed size.

In order to provide means by which the use of the unit shown in Figure 6 may be reduced to a minimum, I have devised a comparatively light and collapsible or telescopic unit, as shown in Figure 14, consisting of four members 65, 66, 67 and 68, two edges of each sheet being preferably bent at an angle, preferably trough-shaped, and the two trough-shaped portions 69 and 70 being received one within the other so as to be extensible, to form a sectional extensible unit, the length and width of which can readily be changed at will with little effort, and in order to strengthen such light members or units I employ a cross piece 71 of any shape or design, such, for instance, as small channel bars or rounded pipes, in the present instance, being shown as of tubes of rectangular section, partly open and placed against plates into the channels or slots and secured so as to guard against pulling out lengthwise by turning up lugs or the like 72. These bars or tubes of whatever shape they may be, are formed of two pieces and designed to telescope one within the other, together with the unit, these cross pieces or tubes being free to move in the slots crosswise and in order to have said tubes of all cross pieces equally spaced no matter to what position the unit is stretched or collapsed, I employ spacers attached to each tube and to each end of the unit, the spacers being designed in a number of ways to accomplish the same results. These units are also provided with openings 73, as seen in Figure 14, along the edges for the purpose of connecting them to other units.

Upon reference to Figures 14 and 15 it will be readily understood how the sections of this collapsible unit are actuated by means of the toggle lever connections 74.

In Figure 20 I have shown how a collapsible unit can be used to beautify plain surfaces of poured walls by forming sunken panels by use of such collapsible unit with a molded edge, as seen at 75 in said Figure 20. In this manner I am enabled to form a molded recessed panel of various sizes by the use of the same unit.

Figure 21:
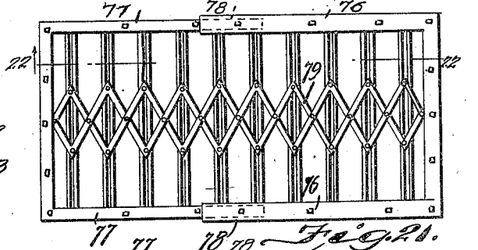
Figure 21 is a view of a telescoping section slightly modified from that shown in Figure 14 in that it is adapted to telescope in one direction only.

In Figure 21 is shown a collapsible unit of somewhat similar construction except that it collapses in one direction only. This collapsible unit is formed of two sections 76 and 77, the adjacent ends of which overlap, as at 78, and are guided one by the other, suitable lazy tong connection 79 being provided for extending or collapsing the same. In this form the metal is curved in to spring shape at the point of lap to form a tight joint.

Figures 22, 23:
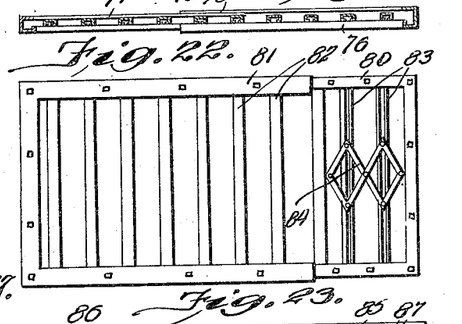
Figure 22 is a section on the line 22—22 of Figure 21.
Figure 23 is a view of a modified form of telescoping section differing from that shown in Figures 21 and 22 in that it telescope only to a small extent.

In Figure 23 I have shown a collapsible unit quite similar to that shown in Figure 21, except that the sections 80 and 81 and the greater number of tubes 82 are solidly attached to the unit and only the two tubes 83 can move about and as a consequence this unit can be shortened or lengthened only to a limited extent. Suitable toggle mechanism 84 is provided for this purpose.

Figure 24:
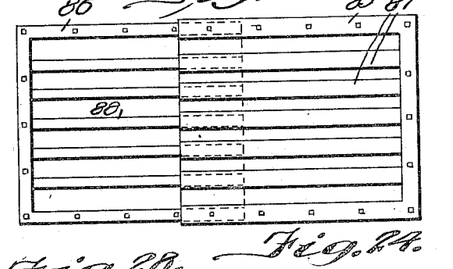
Figure 24 is a view of a telescoping section in which the reinforcing bars telescope together with the section itself similar to the bars of Figure 14.

In Figure 24 I have shown another form of collapsible unit which permits of the omission of spacers in which the two sections 85 and 86 are employed and the telescopic members 87 and 88 are solidly fastened at each end to the end portions of said members 85 and 86 and telescoped together with the unit.

It is to be understood that a molded edge such as shown at 75 in Figure 20 may be provided on each or all of these collapsible units or used as a separate collapsible molding piece, as shown in Figure 37 at 89, 90, 91 or 92. Other forms of collapsible units may be employed, such as seen at 93, 94 and 95 in Figure 37, the same being made of different shapes or forms as may be required. The use of a collapsible unit such as 93 is also seen in Figure 38. At 96 in Figure 37 is also shown another form of collapsible unit.

In Figures 33, 34, 35 and 36 I have shown different forms of collapsible units or sections, and the methods of applying the same to the formation of a column, or circular bodies either the inside of a column or the outside. It is to be noted that no other clamping, stiffening or bracing devices are required except the connecting up of the collapsible units themselves.

In Figure 33 the units are formed of oppositely disposed interengaging longitudinally telescoping members 99, shown in plan in Figure 34, and Figure 35 shows in top plan curved or arc-shaped sections of longitudinally telescoping members with flanges 100, for the connection of adjacent members.

Figure 36 shows a curved unit formed of interengaging telescoping sections 101 and 102.

Figure 39 shows the manner in which a plurality of triangular sections may be arranged to form a polygonal pillar or column, and each of these triangular units may be provided with a facing plate 104.

Figure 30:
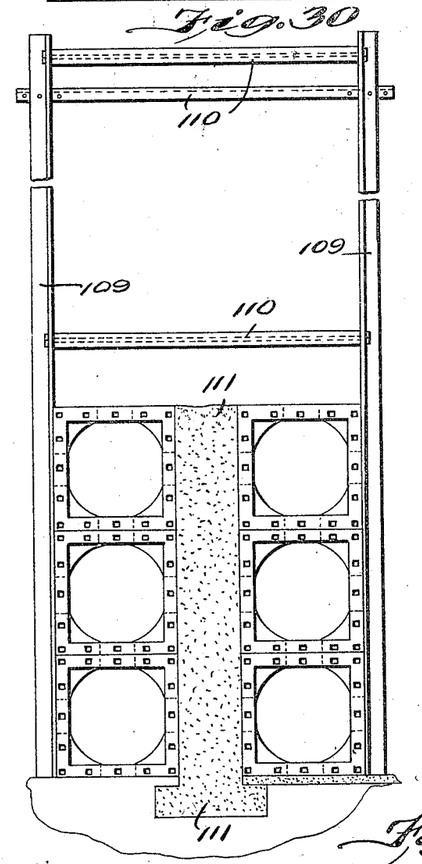
Figure 30 is a view of a piece of concrete wall showing a method of building walls without separators by the use of my sectional molds.
Figure 31:
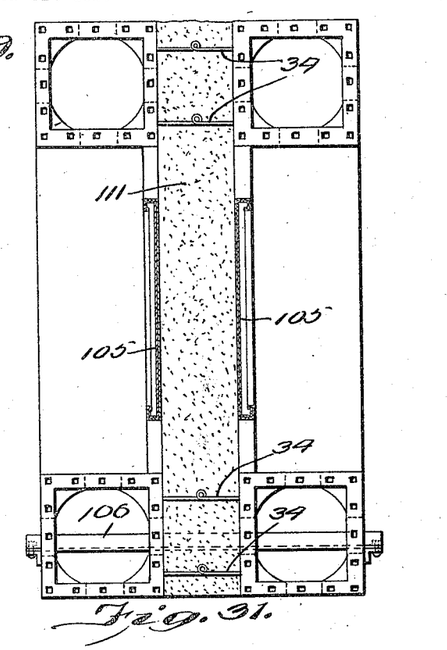
Figure 31 is a view, partly in section, of a wall built by the use of two different sections of mold, one section being of the telescoping form shown in Figures 21, 23, or 24, and held in place the proper distance apart by separators, such as shown in Figure 19 or in the manner shown in Figure 30.
Figure 32:
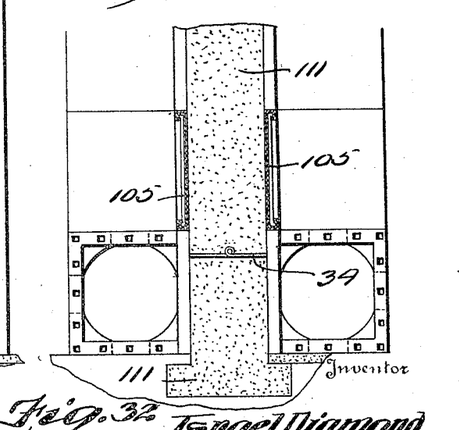
Figure 32 is a section through Figure 31.

Figure 1 shows the use of a triangular unit 103 in connection with other forms of units hereinbefore described, and said Figure 1 as well as Figures 27, 28, 29, 30, 31, 32, 37 and 38 show what can be accomplished by combining units such as illustrated in Figures 6, 8, 9 and 10, collapsible units and telescoping moldings etc., Figures 31 and 32 showing the manner in which I combine the use of the units of Figure 6 and collapsible units by forming what may be termed a frame of the units of Figure 6, and then filling in the inside of the frame by collapsible units 105 and thus construct one side of a form, the other side being formed in a similar manner. The units are spaced apart by means of tie rods 34, as shown in Figure 32, or angle irons 106, as shown in Figure 31, or both angle irons and tie rods may be employed, if desired. However, these collapsible units are designed to be of sufficient strength so that no other tying is required except at the units, as seen in Figure 32.

In Figures 29 and 30 I have illustrated a method by which walls can be built without the use of ties through the wall. This method bears a very direct relation to the present invention as it is not possible to do this except by the use of units substantially such as shown in Figure 6. In Figure 29 I have shown a temporary face plate 107 by the use of which special facing material, as at 108, is used and held in position until the mold is filled with concrete and then withdrawn, and the concrete rammed so as to properly unite with the facing material. The use of such a plate or other inserts would not be possible or practicable if tie rods were used to hold the form properly spaced. In Figure 29 this face plate is shown partially removed.

Figure 30 shows the use of angle irons 109 connected by cross members 110 which may be of angle iron or other form and between the angle irons 109 the units of Figure 6 or other form are disposed.

111 designates the concrete in all the different figures where concrete is shown except in Figures 12 and 13 where such concrete is represented by the numeral 48.

It is to be understood that in all of the forms of units suitable holes are to be provided so that the adjacent units may be connected up when desired.

Figure 25:
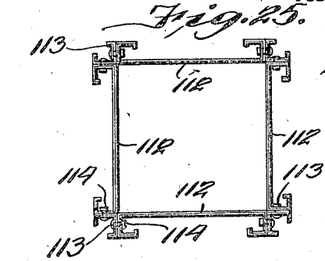
Figure 25 is a cross section through a column composed of telescoping sections.
Figure 26:
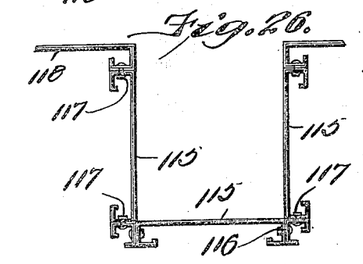
Figure 26 is a section through a beam and part of floor constructed by the use of telescoping sections, each section and each connecting angle having a telescoping feature.

Figure 25 shows a cross section through a form for a column composed of telescoping sections 112, each having flanges 113 and these flanges secured by bolts or the like 114, while Figure 26 shows a section through a beam and part of a floor form composed of similar sections 115 with flanges 116 and securing bolts 117, 118 showing the floor portion, these being all of telescopic sections, that is each section and each connecting angle in this formation having a telescoping feature.

It is believed that the foregoing description clearly sets up my invention in its various forms and the manner in which these forms may be combined for the purpose of constructing any desired character, form or shape of wall, partition, column or other structure.

What I claim as new is:—

1. A concrete-form structure comprising units, each with a plurality of its sides integral with each other and each unit complete in itself and having angular corner braces and flanges provided with openings for the reception of means for union with an adjacent unit.

2. A concrete-form unit with a plurality of its sides integral with each other and one of said sides being open with angular braces at the corners.

3. A concrete-form unit with a plurality of its sides integral with each other and one of said sides being open with angular braces at the corners, said unit being formed with marginal flanges.

4. A concrete-form unit with a plurality of its sides integral with each other and one of said sides being open with angular braces at the corners, said unit being formed with marginal flanges and the flanges provided with perforations to receive securing means.

5. A unit formed with a plurality of its ends integral with each other with some of its faces open, and having angular bracing means at the corners of said open faces.

6. A concrete-form unit formed of a sheet of material bent to form three sides of the unit and having angular braces at the corners.

7. A concrete-form unit formed of a sheet of material bent to form three sides of the unit and having angular braces at the corners, said unit having surrounding flanges.

8. A concrete-form unit formed of a sheet of material bent to form three sides of the unit, said unit having surrounding flanges and angular stiffening means within the unit.

9. A concrete-form unit formed of a sheet of material bent to form three sides of the unit and having angular braces at the corners, said unit having surrounding flanges and stiffening means within the unit and joining opposite flanges.

10. A unit formed with three integral sides with a portion removed from a side to leave an opening therein and a fourth side formed of the pieces removed to form said opening.

11. A unit formed with three integral sides with a portion removed from a side to leave an opening therein, and a fourth side with angular corner braces for the corners formed of the material removed to make said opening.

12. A unit formed with three integral sides with a portion removed from a side to leave an opening therein, braces for the corners formed of the material removed to make said opening, and means also from said removed material connecting the corner braces.

13. A unit formed of metal with a plurality of its sides integral with each other, and members cut out from said sides to form openings, said members joining portions of said sides and bracing the same.

14. A unit formed of a sheet of metal bent to form three sides of the unit, portions of two sides being removed to leave openings in said sides, and said pieces formed into smaller pieces and the latter employed to join the said sides to form the unit and to brace the same at the corners.

15. A unit formed with three integral sides with a portion removed from a side to form an opening therein, a fourth side of sections forming corner braces combined with a threaded member engageable in opposed units.

16. A unit formed with three integral sides with a portion removed from a side to form an opening therein, a fourth side of sections forming corner braces combined with a threaded member engageable in opposed units and having means to engage a tie-rod.

In testimony whereof I affix my signature.

ISRAEL DIAMOND.